US012078068B2

(12) United States Patent
Di Sisto et al.

(10) Patent No.: US 12,078,068 B2
(45) Date of Patent: Sep. 3, 2024

(54) TURBINE AND BLADE FOR THE PROTECTION OF THE ROOT FROM FLOW PATH HOT GASES

(71) Applicant: NUOVO PIGNONE TECNOLOGIE—SRL, Florence (IT)

(72) Inventors: Paolo Di Sisto, Florence (IT); Leonardo Tognarelli, Florence (IT); Simone Cubeda, Florence (IT)

(73) Assignee: Nuovo Pignone Tecnologie—SRL, Florence (IT)

( * ) Notice: Subject to any disclaimer, the term of this patent is extended or adjusted under 35 U.S.C. 154(b) by 0 days.

(21) Appl. No.: 17/905,301

(22) PCT Filed: Mar. 4, 2021

(86) PCT No.: PCT/EP2021/025092
§ 371 (c)(1),
(2) Date: Aug. 30, 2022

(87) PCT Pub. No.: WO2021/175495
PCT Pub. Date: Sep. 10, 2021

(65) Prior Publication Data
US 2023/0358146 A1 Nov. 9, 2023

(30) Foreign Application Priority Data
Mar. 4, 2020 (IT) ........................ 102020000004585

(51) Int. Cl.
*F01D 11/00* (2006.01)
*F01D 5/08* (2006.01)
*F01D 11/04* (2006.01)

(52) U.S. Cl.
CPC ............ *F01D 11/001* (2013.01); *F01D 5/081* (2013.01); *F01D 11/00* (2013.01); *F01D 11/04* (2013.01); *F05D 2220/32* (2013.01); *F05D 2240/24* (2013.01); *F05D 2240/55* (2013.01)

(58) Field of Classification Search
CPC ................................ F01D 11/04; F01D 11/00
See application file for complete search history.

(56) References Cited

U.S. PATENT DOCUMENTS 893,077 A 7/1908 Karper
3,043,562 A 4/1961 Fusner et al.
3,294,364 A 12/1966 Stanley
4,199,131 A 4/1980 Boski et al.
4,744,386 A 5/1988 Frazer
(Continued)

FOREIGN PATENT DOCUMENTS

EP 2208860 A2 7/2010
EP 2402561 A2 1/2012
(Continued)

*Primary Examiner* — Long T Tran
(74) *Attorney, Agent, or Firm* — Paul Frank + Collins P.C.

(57) ABSTRACT

A turbine, and particularly a low pressure turbine is disclosed, which comprises a plurality of rotor members and spacers for arranged between rotor members, to avoid that an ingested gas flow from the hot gas flow path channel reaches the wheel space. The rotor members each include a deflector. The deflector is placed in correspondence with each spacer and deflects the purging air pumped up from the wheel spaces by the rotor members, to prevent the ingested gas flow to heat up the roots of the blades.

17 Claims, 5 Drawing Sheets

(56) References Cited

U.S. PATENT DOCUMENTS

| | | | | |
|---|---|---|---|---|
| 5,281,097 | A | 1/1994 | Wilson et al. | |
| 5,479,706 | A | 1/1996 | Tamano et al. | |
| 5,535,828 | A | 7/1996 | Kinderen et al. | |
| 5,749,706 | A | 5/1998 | Maar | |
| 5,833,244 | A | 11/1998 | Salt et al. | |
| 8,141,641 | B2 | 3/2012 | Chan | |
| 8,794,260 | B2 | 8/2014 | Faillat et al. | |
| 11,248,485 | B1 * | 2/2022 | Baldiga | F01D 11/22 |
| 2007/0089545 | A1 * | 4/2007 | Roney | F01D 25/00 73/865.8 |
| 2009/0142195 | A1 | 5/2009 | Brittingham et al. | |
| 2010/0178160 | A1 | 7/2010 | Liotta et al. | |
| 2010/0254806 | A1 * | 10/2010 | Deodhar | F01D 11/001 415/174.4 |
| 2012/0003079 | A1 * | 1/2012 | Farrell | F01D 11/005 415/173.6 |
| 2013/0058756 | A1 | 5/2013 | Tham et al. | |
| 2014/0037435 | A1 * | 2/2014 | Porter | F01D 11/04 415/173.7 |
| 2015/0184529 | A1 * | 7/2015 | Zheng | F01D 11/02 29/889 |
| 2016/0186664 | A1 * | 6/2016 | Kirtley | F02C 7/28 415/115 |
| 2017/0022818 | A1 * | 1/2017 | Weinert | F01D 5/087 |
| 2017/0023023 | A1 | 1/2017 | Hiernaux | |
| 2017/0183974 | A1 * | 6/2017 | McDufford | F04D 29/668 |
| 2017/0326757 | A1 * | 11/2017 | Marin | D03D 25/005 |
| 2018/0100396 | A1 * | 4/2018 | Lipkin | B23P 6/002 |
| 2019/0284946 | A1 | 9/2019 | Berdowski | |
| 2020/0056486 | A1 * | 2/2020 | Schrape | F01D 5/141 |
| 2023/0358146 | A1 | 11/2023 | Disisto | |

FOREIGN PATENT DOCUMENTS

| | | | |
|---|---|---|---|
| EP | 2586996 | A2 | 5/2013 |
| EP | 3203023 | A1 | 8/2017 |
| EP | 3540180 | A1 | 9/2019 |

* cited by examiner

TURBINE AND BLADE FOR THE PROTECTION OF THE ROOT FROM FLOW PATH HOT GASES

TECHNICAL FIELD

The present disclosure concerns a gas turbine, which is capable of protecting the rim of the wheels of the rotor assemblies from ingestion the hot gases into the wheel spaces while operating.

BACKGROUND ART

As is well known, a gas turbine is an energy conversion plant, which usually comprises, among other things, a compressor, to draw in and compress a gas, a combustor (or burner) to add fuel to heat the compressed air, a high pressure turbine, comprising a plurality of rotor assemblies, to extract power from the hot gas flow path and drive the compressor and a low pressure turbine, also comprising a plurality of rotor assemblies, mechanically connected to a load.

In low pressure turbines design in particular, precautions are usually taken to reduce the gas ingestion from the hot gas flow path, which may have a detrimental impact on not hot gas components as wheels and spacers. The phenomenon of the gas ingestion from the hot gas flow path may occur when the engine operates at partial load.

More specifically, a typical low pressure turbine comprises, as mentioned above, a plurality of rotor members, each having a rotor wheel with a rim, on which a plurality of blades is coupled.

Each blade comprises a male-shaped dovetail or root, designed to fit with one corresponding groove obtained on the rim of the rotor wheel. The wheels are usually made of a less noble material than the blades.

Between two adjacent, facing rotor wheels, a wheel space is individuated between two rotor wheels of two rotor members.

The phenomenon of the gas ingestion from the hot gas flow path usually occurs when part of the hot gas flows into the wheel space, thus causing wheel rims to operate above or close to their material temperature limits, which, being made of nonnoble material, can get damaged, reducing the useful life of the wheels. It implies that this phenomenon might be the cause of wheel dovetail failure (e.g. large deformation) and subsequently release of blades.

In addition to the above, the wheel spaces are usually purged. To this end, the gas turbines are equipped with a piping system to provide purging air coming from the compressor to low pressure turbine. In particular, the purging air is introduced into the wheel spaces of the low pressure turbines. In part this reduces the overall temperature of the wheel spaces.

The hot gas ingestion is normally prevented when the amount of purging air is equal or more than the amount of air pumped up by the wheels. If less, than the pump effect will compensate what not provided by the purging system with hot gas air that will sucked in far from the wheel and pumped out near the wheel (recirculation). The recirculation may happen when the engine is running at low power and subsequently the compressor provides less purging air to the low pressure turbine while the low pressure turbine may still run at its high speed.

In order to reduce the gas ingestion of the hot gas flow path passing through the low pressure gas turbine to the wheel spaces, some solutions are available in the state of the art.

In particular, spacers may be added between wheels, these spacers may have rims that axially cover the space not covered by the wheels, these spacer rims may also radially extend to the same outer diameter of the wheels so to minimize the portion of the wheel rim above the wheel space cavity. Although the spacers realize a physical barrier against the hot gas ingestion, they are normally not in contact with the rims of the adjacent wheels and therefore hot gas may flow inside the gaps and reach the wheel spaces. The spacer may protect adjacent wheels even when wheels have a different outer diameter by shaping conical the spacer rim.

Accordingly, an improved turbine and blade capable of reducing any possible gas ingestion from the hot gas flow path would be welcomed in the technology.

SUMMARY

An improvement of the above-mentioned spacers is the provision of a near flow path seal (NFPS), which are capable of pushing wheel space sealing near the hot gas path. The NFPSs have replaced the more traditional spacers, to better protect the wheel rims from hot gas ingestion that may take place not only inside the wheel cavities but also through the lab seal. From a structural standpoint, the NFPS is a segment (i.e. arm members) and not a ring (as the spacers do), and therefore they introduce leaks between adjacent rotor members. Besides they require a multi-connection system, which necessarily increases the complexity of the solution, so as to have them engaged to internal supporting rotor wheels. The NFPS are indeed small components if compared to the traditional spacers and therefore may be made of more noble material.

However, recently, in order to increase the power and the efficiency of the gas turbines, the temperature of the hot gas flow path is increased. To this end, the purging air flow from the compressor is also reduced, increasing the risk of gas ingestion from the hot gas flow path.

Also, when the low pressure turbine spins at a slower speed, the hot gas path undergoes proportionally to a reduced pressure variation, since the hot gas flow path has a lower expansion at lower velocity, passing from a stage to another or from a rotor assembly to another. At the same time, as said above, when the low pressure turbine spins at a lower speed the pumping effect is reduced.

Finally, the temperatures of wheel spaces are normally monitored by appropriate thermocouples. However, owing to the always more compact layout of the turbines, the installation of the thermocouples has become way more complicated, with subsequent lower reliability of the thermocouples. Moreover, the thermocouple installation is complicated when spacers or any other mechanical barrier is arranged between two rotor assemblies. Then, the number of installed thermocouples tends to be reduced, this causing a reduced control of the risk of temperature increase of wheel rims and their possible deterioration.

Accordingly, in one aspect, the subject matter disclosed herein is directed to a turbine, which comprises a plurality of rotor members, rotating due to the expansion of hot burned gas flowing into a hot gas flow path channel. Each rotor member comprises a rotor wheel. Between two adjacent rotor wheels, a wheel space is individuated. Also, each rotor member has a protective spacer, arranged between two facing rotor members, configured to avoid an ingested gas flow from the hot gas flow path channel to reach the wheel space. Also, the turbine has stator spacers. Between each stator spacer and a relevant protecting spacer, a channel is delimited. The rotor members also comprise a deflector, configured to deflect the purge air pumped up from the wheel spaces by the rotor members to the channel, in which the pressure is lower than that of the gas deflected by the deflector.

In another aspect, the subject matter disclosed herein regards that the deflector is arranged on the shank of each blade.

In another aspect, the subject matter disclosed herein concerns that the deflector is arranged on the rim of the rotor wheel of the blade and it can cover the gap between spacer and wheel.

In another aspect, disclosed herein is that the deflector has an upper surface, configured to deflect the possible gas ingestion from the hot gas flow path channel, toward the upper surface of the spacer.

In another aspect, disclosed herein is that the deflector is configured to turn the ingested gas flow over the upper surface of the shank, while, when the turbine operates at baseload condition, the deflector allows the purging air gas to flow toward radial direction reaching the hot gas flow path channel, so as to prevent the hot gas ingestion.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

Improvements to gas turbines have been discovered. Gas turbines have many parts, among them low pressure turbines. Such low pressure turbines are formed of many blades radiating from a central hub, and angled to move air through the engine. Some areas of the gas turbine are very hot. Others are cooler. A known problem is that part of the hot gas moved by the blades may flow toward specific conditions toward the central hub, thus causing damages and reducing the useful life of the turbines.

The inventors discovered that this problem may be alleviated and/or addressed by arranging a new deflector element in correspondence of the shank of each blade and interposed between the blade itself and a spacer, arranged between two adjacent wheels. The deflector is shaped to deflect the purging air toward the low pressure channel 74 between two adjacent rotor members, and in particular toward the upper surface of the spacer and subsequently to deflect up possible hot gas ingestions. In this way, the deflector protects the turbine internal parts, preventing an average increase of the temperature therein.

Figure 1:
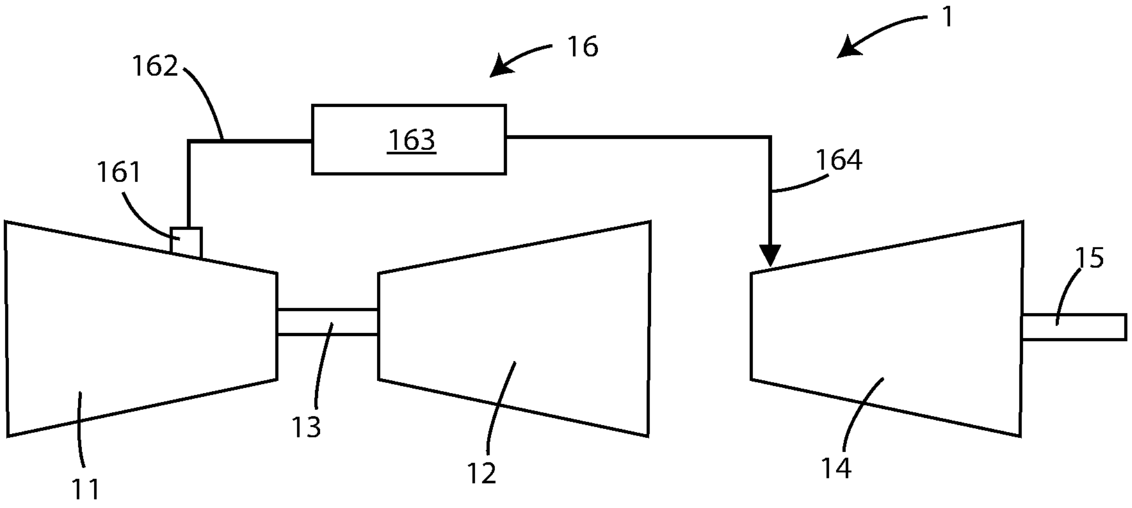
FIG. 1 illustrates a schematic of a gas turbine.

FIG. 1 illustrates schematically, a gas turbine, wholly indicated with the reference number 1. The gas turbine 1 includes, among other things: a compressor 11, to draw in and compress a gas to be supplied to a combustor or burner (not shown in the figure) to add fuel to heat the compressed air, a high pressure turbine 12, comprising a plurality of rotor assemblies, to extract power from the hot gas flow path and drive the compressor 11, a shaft 13, connecting the compressor 11 and the high pressure turbine 12, and a low pressure turbine 14, also comprising a plurality of rotor assemblies, for driving, by a further shaft 15, for example, a gear box and a centrifugal compressor, or any other load.

In addition, the gas turbine 1 includes a purging system 16, to provide purging air to low pressure turbine 14. The purging system generally comprises a bleed extraction 161, connected by a connection pipe 162 to a cooler 163, which, in its turn, is connected by a purging pipe 164 to the low pressure turbine 14, to purge the wheel spaces (see below) between the rotor assemblies. This has the effect and the function to reduce in part the overall temperature of the wheel spaces.

Figure 2:
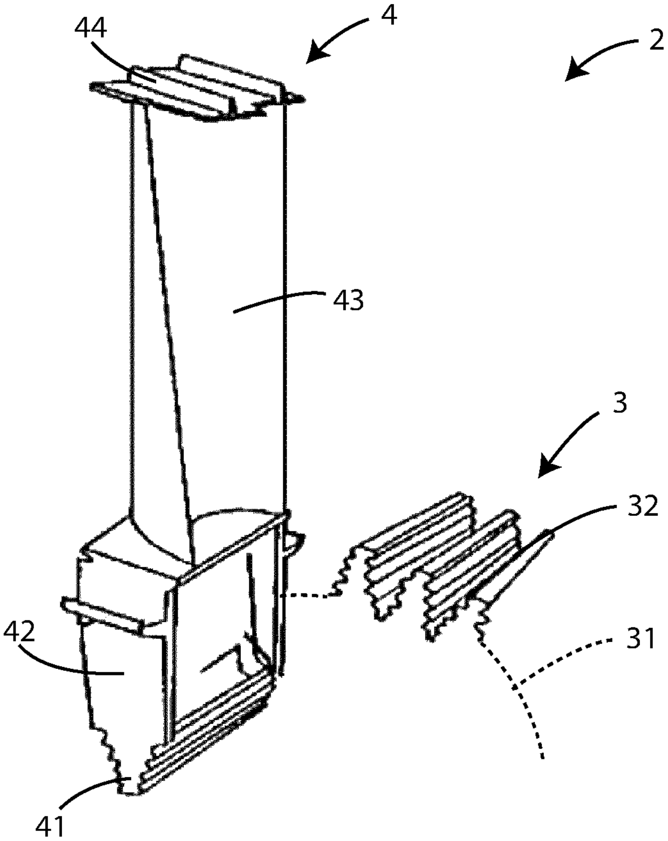
FIG. 2 illustrates an exploded view of a blade.
Figure 3:
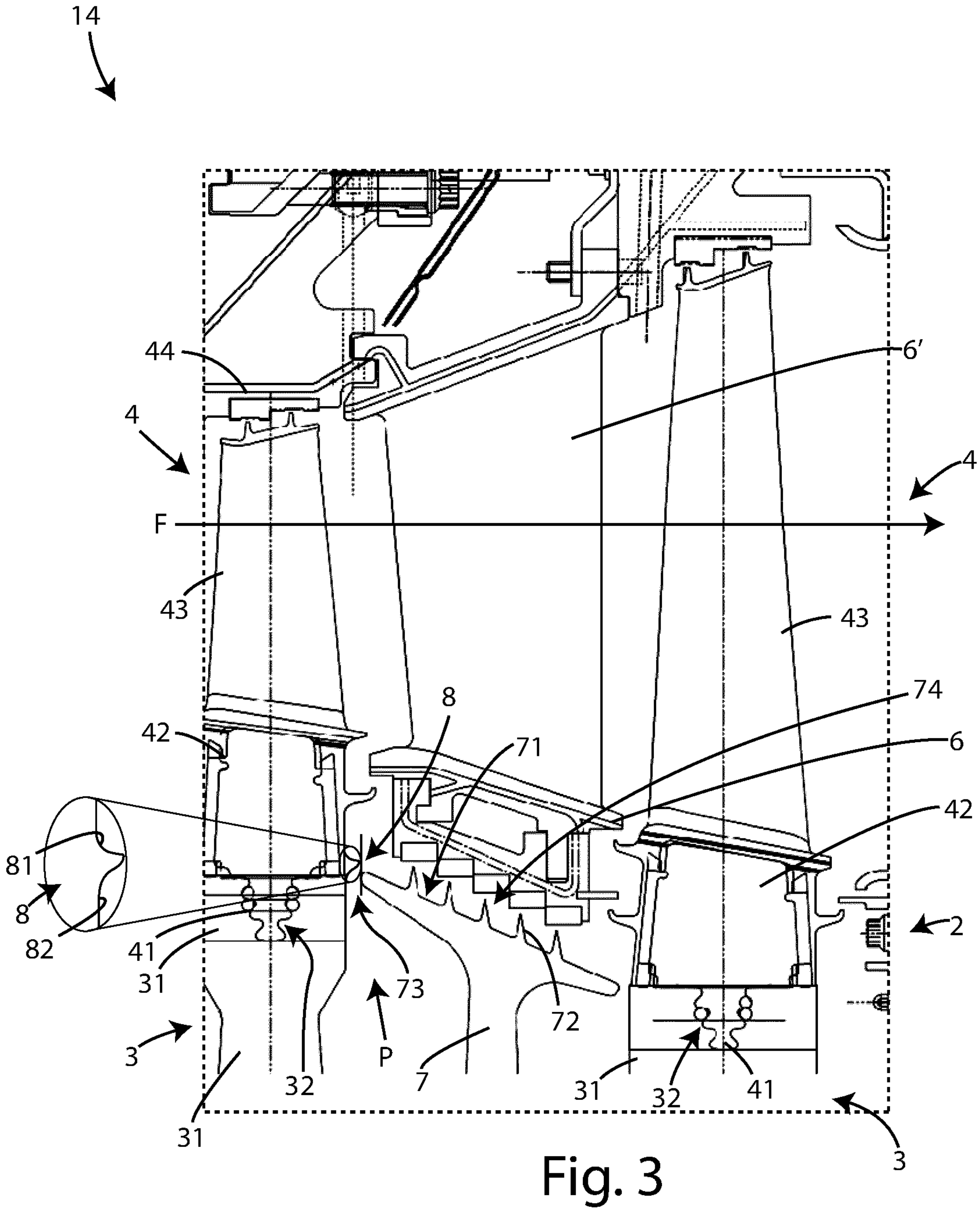
FIG. 3 illustrates a partial section of a low power turbine according to a first embodiment.

Referring also now to FIGS. 2 and 3, the low pressure turbine 14 usually comprises a plurality of rotor members, herein indicated with reference number 2, rotate around an axis of rotation R, and are coupled with the shaft 15.

More specifically, each rotor member 2 comprises a rotor wheel 3, coupled to the shaft 15 and having a rim 31 and a plurality of circumferentially spaced female dovetail-shaped slots or grooves 32 about the rim 31. In the embodiment, each groove 32 has a firtree shape. However, in some embodiments, the grooves can have a different shape.

Each rotor member 2 also comprises a plurality of blades 4, each one comprising, in its turn, a male-shaped dovetail or root 41, designed to fit with one corresponding groove 32 of the rotor wheel 31, along an insertion direction. Therefore, each root 41 has almost the same shape of a corresponding groove 32.

The roots 41 of the blade 4 have only the mechanical function to firmly couple the blade 4 to the rotor wheel 3, and, in particular, to the grooves 32 of the rotor wheel 31.

Each blade 4 also comprises a platform or shank 42, which the root 41 is connected to, and an airfoil 43, coupled to the shank 42. The airfoil 43 is made of a noble material, since the airfoil 43 is subject to a remarkable thermal and mechanical stress. At the top of the airfoil 43, there is also an airfoil shroud 44, for connecting each blade 4 to the neighboring ones.

As said, between two adjacent and facing rotor wheels, a wheel space 5 is individuated and between two rotor wheels 3 of two rotor members 2.

FIG. 3 also illustrates a stator spacer 6 of the turbine 14 stator (not shown in the figures), interposed between two rotor member 2, and a nozzle 6'.

The hot gas flow path flows on a hot gas flow path channel, which is indicated with the arrow F, which of course passes through the airfoils 43 of the blades 4.

Between two adjacent rotor wheel 3, a protective spacer 7 is arranged, which has the function of realizing a barrier to prevent gas ingestion from the hot gas flow path channel F to the wheel space 5, which may cause an increase of temperature in the upper side of the wheel spaces 5, and consequently of the temperature of the roots 41 of the blades 4. As said, in excess of thermal stress to the roots 41 is detrimental for their operation. In this embodiment, the protective spacer 7 is conical. However, in some embodiments the protective spacer 7 can be cylindrical or with other shapes, always with the function of defining and creating a protection for the wheel spaces 5. Also, on the upper surface 71 of each spacer 7, which faces the stator spacer 6, there is a labyrinth seal 72, for minimizing the amount of purging flow P necessary to prevent hot ingestion through the gap between spacer 7 and stator spacer 6 (typically called diaphragm).

Still referring to FIG. 3, arrow P shows the purging air path, which comes from the purging system 16. The purging air has the function to reduce the temperature of the wheel spaces 5 as well as to create, with its pressure, a pressure barrier against the gas injection from the hot gas flow path channel F. The shank 42 of each blade 4 has a deflector 8, obtained on the shank 42 of each blade 4 and arranged in correspondence with the protective spacer 7, and particularly of its edge, so as to be arranged to cover a gap 73 between each protective spacer 7 and the rotor member 2, and in particular, with reference to the embodiment of FIG. 3, between the protective spacer 7 and the rim 31 of the rotor wheel 3.

The channel 74 is at a pressure lower than that of the gas deflected by the deflector 8. More specifically, the pressure along the channel 74 lowers along the direction of the hot gas flow path channel F. Indeed, in the field considering a couple of adjacent rotor members, the rotor member 2 upstream the hot gas flow path channel F is called forward rotor member, and the purging air or gas surrounding such forward rotor member 2 has a higher pressure that the following one, called aft roto member. the deflector is then arranged on the forward rotor member 2, which necessarily has higher pressure that the channel 74.

In other words, in some embodiments, the deflector 8, which actually is ring-shaped, has the protruding edge faced in front of the edge of the protective spacer 7, so as to be in correspondence of the same, to close the gap between the protective spacer 7 and the rotor wheel 3. In fact, the protective spacer 7 is also ring-shaped, with an edge facing the rotor wheel 3. The surface of the deflector 8 is such that it can deflect hot gases as better explained below.

Figure 5:
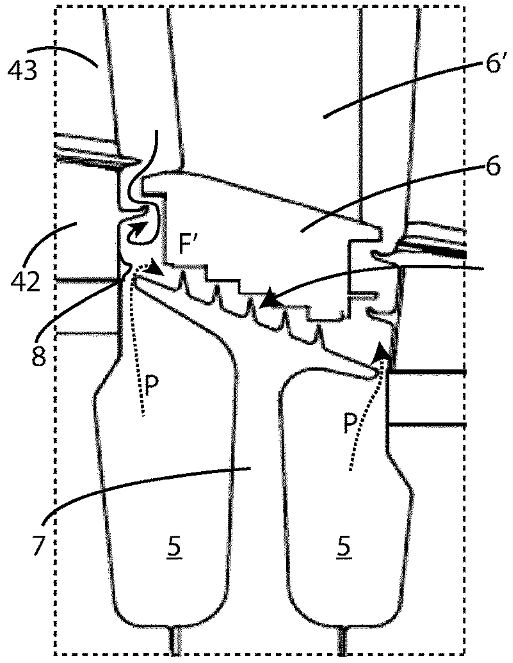
FIG. 5 illustrates the section of the low power turbine of FIG. 4, where a low gas ingestion is shown.

In the embodiment shown in FIG. 3, and in particular, referring to the zoomed window shown in the same figure, the deflector 8 is shaped having an upper surface 81, intended to deflect the possible gas ingestion from the hot gas flow path channel F, back to the main flow path as shown in FIG. 5, and a lower surface 82, this intended to allow the purging air or gas coming from the wheel space 5 passing through the gap 73 between each protective spacer 7 and the rotor member 2.

In some embodiments, the deflector 8 can be arranged in different positions and, more specifically, it may be obtained on the rotor wheel 3, almost in correspondence with the rim 31 (see FIG. 7 commented below).

In general, it is required that the deflector 8 is able to deflect any possible gas ingestion from the hot gas flow path channel F that can overcome the mechanical barrier of the protective spacer 7 and whenever, for instance, the purging air P pressure from the wheel spaces 5 is not enough for preventing that in general the hot gas to enter the wheel spaces 5.

The low pressure turbine 14 and the deflector 8 operate as follows.

When the low pressure turbine 14 operates and the rotor members 2 rotates, the purging air P coming from the compressor 163 and conveyed by the purging pipe 164, cools the wheel spaces 5. At the same time, the combined effect of the pumping effect, due to the spinning velocity of the low pressure turbine 14, namely of the rotor members 2, along with the barrier realized by the protective spacer 7, prevents the gas ingestion from the hot gas flow path channel F into the wheel spaces 5. Also, any possible gas ingestion, even local, is further prevented by the action of the deflector 8, which, on the one hand, being it arranged in correspondence with the protective spacer 7, it does deflect possible local gas ingestions from the hot gas flow path channel F by the first surface 81, and on the other hand, it also allows the purging air P to pass through the gap 73. Local gas ingestion can take place owing also to the fact that the pressure field caused by the hot gas flow in the hot gas flow path channel F is not always circumferentially uniform. With reference to the deflector 8, being arranged in correspondence with the protective spacer 7 means in some embodiments that is capable of deflecting the hot gases back up toward the shank 42 of the blade 4.

The operation of the deflector has a particular impact in case the spinning velocity of the low pressure gas turbine 14 is reduced, for instance, when a low pressure gas turbine 14 operates at 50% of its nominal operational speed. In this case, the protective action of the pumping effect is reduced proportionally to the velocity reduction.

Figure 4:
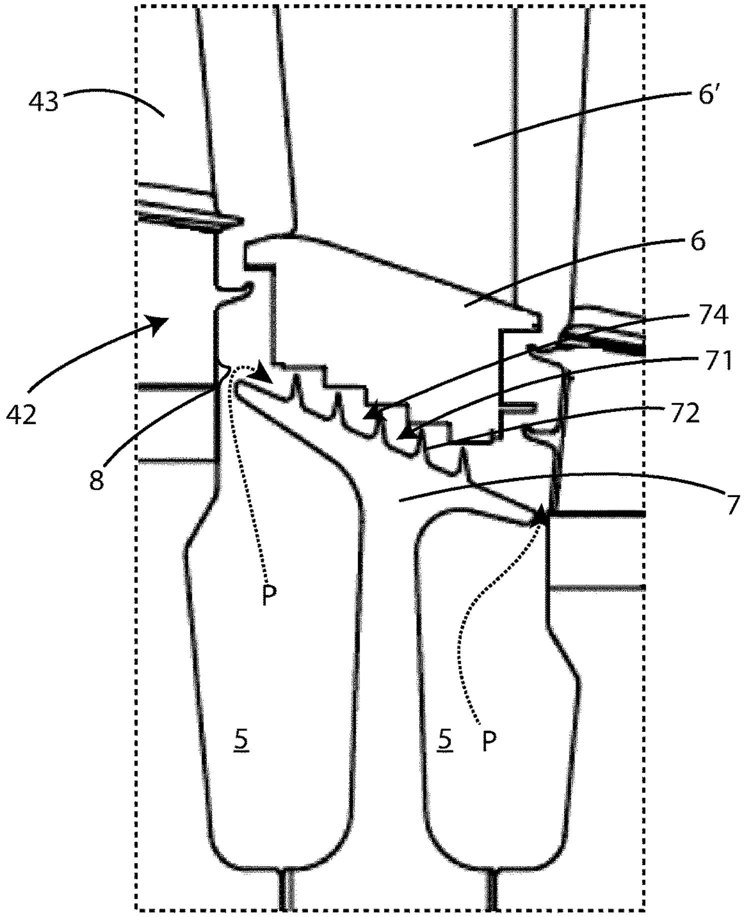
FIG. 4 illustrates a section of a low power turbine section according to a first embodiment, where the purging air flow in normal operating conditions is shown.
Figure 6:
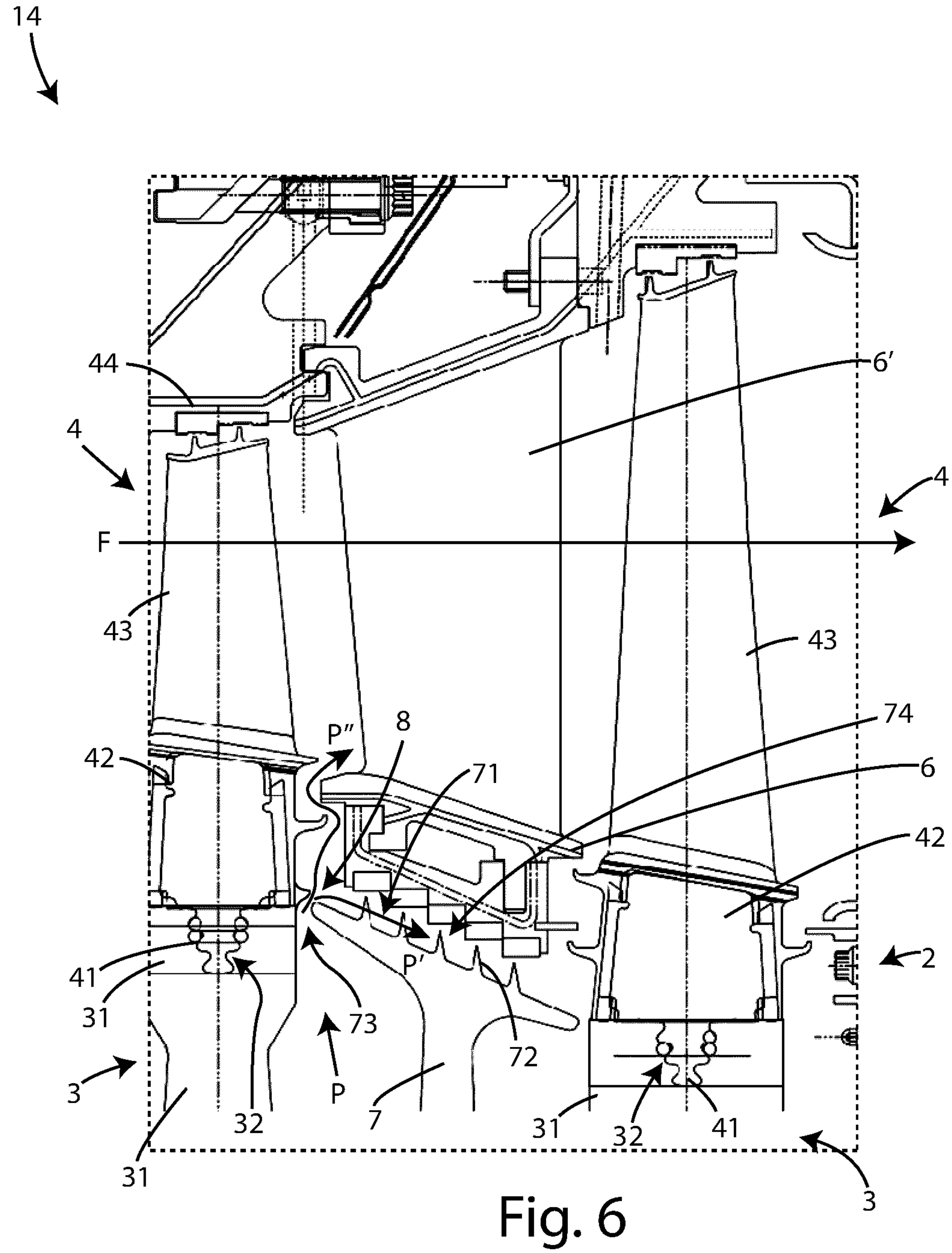
FIG. 6 illustrates the section of the low power turbine of FIG. 4, with purging flow in a so-called baseload condition.

In particular, in order to better describe the operation of the deflector 8, FIGS. 4, 5 and 6 illustrate some operating conditions of the low pressure turbine 14. In FIG. 4 a typical flow path of the purging air P is seen, where no gas ingestion is foreseen. In this case, the purging air P coming from the compressor 11 passes through the wheel spaces 5 and reaches the hot gas flow path channel F, protecting the wheel spaces 5 from the high temperature of the hot gases. In this operating condition, the element 8 does not operate as a deflector because it doesn't cover the protective spacer 7. It is more an element that reduces the gap 73.

Referring now to FIG. 5, it is illustrated the prevention of the gas ingestion phenomenon in case of low power operation of the gas turbine. In this case, part (see arrow F') of the hot gas of the hot gas flow path channel F does not reach the protective spacer 7, and in particular the channel 74, the upper surface 71 and the labyrinth seal 72. In fact, the deflector 8 deflects the purging air P pumped up from the wheel spaces 5 by the rotor members 2. The purging air P is deflected by the deflector 8 to the channel 74 and is sucked by the channel 74 itself, since it is at a lower pressure than of the purging air P.

Also, the gas ingestion flow F', thanks to the shape of upper surface 81 of the deflector 8, is forced to turn radially up. In other words, the deflector 8 reverses the direction of the ingested gas flow F'. In particular, the ingested gas flow F' is turned over the upper surface of the shank 42. In this case, the gas ingestion in the wheel spaces 5 is prevented either by the deflector 8 as well as, in particular, by the purging air P coming from the compressor 163. The deflector 8 aids to prevent that possibly the hot ingested gas F' coming from the hot gas flow of the hot gas flow path channel F can leak in the wheel spaces 5, so warming the rim 31.

In FIG. 6 is shown the operation of the deflector 8 when the gas turbine 1 operates at baseload condition, namely when the rotor member 2 rotates at nominal speed. As it is illustrated in FIG. 6, the purging air P coming from wheel spaces 5 splits into two flows, P' and P'', one of which (P') is driven by a pressure variation on the channel 74 (the pressure along the channel 74 it lower than that of the purging gas P) by the deflector 8, and in particular by the lower surface 82; while the other flow P", into which the purging air P is split, is driven by a pumping effect toward the airfoil 43. As it can be seen, in this case, the deflector 8 does not interfere with the pumping effect of the rotor members 2, allowing the flow of the purging air P to reach the flow path F, avoiding the same to be ingested.

Figure 7:
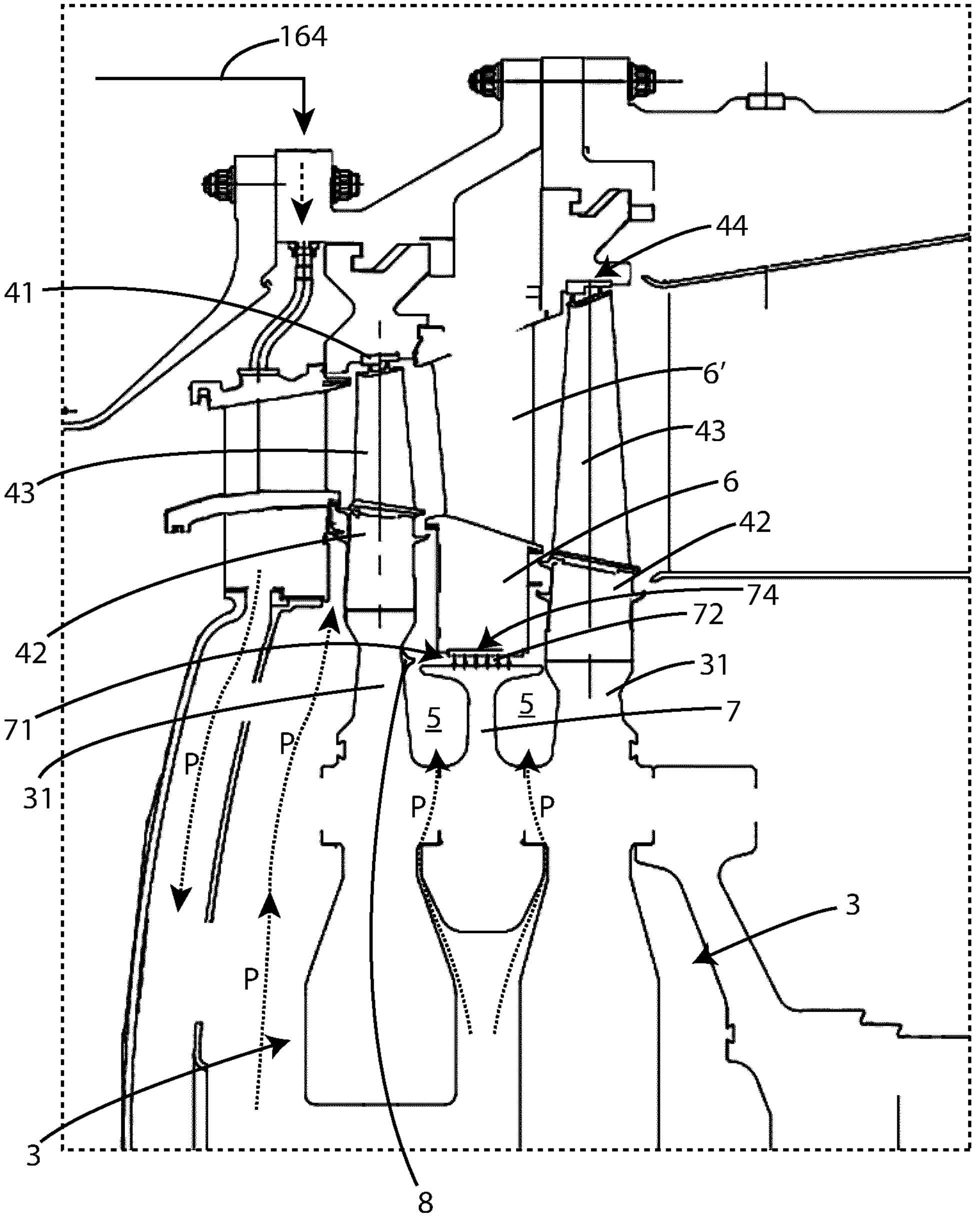
FIG. 7 illustrates a partial section of a low power turbine according to a second embodiment.

Referring to FIG. 7 a second embodiment of an improved low pressure turbine 14 is shown. In the mentioned figure the same reference numbers designate the same or corresponding parts, elements or components already illustrated in FIG. 3 and described above, and which will not be described again. In this case, however, the protective spacer 7 is not conical but cylindrical. Also, in this case, the deflector 8 is placed on the shank 7 or on the rim 31 of the rotor wheel 3, in correspondence of the spacer 7.

FIG. 7 illustrates also several paths of the purging air P coming from the compressor 11 through the purging pipe 164.

The operation of the low power turbine 14, in this case, is the same of that disclosed in the previous figures.

While the invention has been described in terms of various specific embodiments, it will be apparent to those of ordinary skill in the art that many modifications, changes, and omissions are possible without departing form the spirt and scope of the claims. In addition, unless specified otherwise herein, the order or sequence of any process or method steps may be varied or re-sequenced according to alternative embodiments.

Reference has been made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When elements of various embodiments are introduced, the articles "a", "an", "the", and "said" are intended to mean that there are one or more of the elements. The terms "comprising", "including", and "having" are intended to be inclusive and mean that there may be additional elements other than the listed elements.

The invention claimed is:

1. A turbine, comprising:

a downstream rotor member and an upstream rotor member, both configured to rotate due to expansion of hot burned gas flowing into a hot gas flow path channel, the downstream rotor member and the upstream rotor member comprising a rotor wheel, the rotor wheel of the downstream rotor member and the upstream rotor member forming a wheel space;

a protective spacer arranged between the upstream rotor member and the downstream rotor member, the protective spacer configured to avoid an ingested gas flow from the hot gas flow path channel to reach the wheel space;

a stator spacer arranged between the upstream rotor member and the downstream rotor member and spaced apart from the protective spacer so as to form a channel;

a deflector disposed on one of the downstream rotor member and the upstream rotor member; and a purging system fluidly coupled to the wheel space, the purging system configured to provide purging air into the wheel space, wherein the defector is configured to deflect the purging air flowing from the wheel space into the channel, and wherein the channel is at a pressure lower than that of the gas deflected by the deflector.

2. The turbine of claim 1, wherein the deflector is arranged in correspondence with the protective spacer.

3. The turbine according to claim 1, wherein each rotor wheel of the downstream rotor member and the upstream rotor member has an outer rim, and wherein the deflector is arranged on the outer rim of the rotor wheel.

4. The turbine according to claim 1, wherein the deflector covers part of a gap between the protective spacer and rotor wheel.

5. The turbine according to claim 1, wherein each of the downstream rotor member and the upstream rotor member comprises:

a rotor wheel configured to rotate around a rotation axis and having an outer rim and a plurality of circumferentially spaced grooves about its outer rim; and a plurality of blades, wherein each blade comprises a shank, a root coupled to the shank and designed to fit with one corresponding groove of the rotor wheel, and an airfoil for rotating the rotor member by intercepting the hot gas flow path;

wherein the deflector is arranged on the shank; and wherein the deflector covers part of the gap between the protective spacer and the rotor wheel.

6. The turbine according to claim 5, wherein the deflector is configured to reverse the direction of the ingested gas flow over the upper surface of the shank.

7. The turbine according to claim 5, wherein the deflector is integral with the shank.

8. The turbine according to claim 1, wherein the deflector is configured to reverse the direction of the ingested gas flow.

9. The turbine according to claim 8, wherein the deflector has an upper surface configured to deflect to reverse the direction of the ingested gas flow.

10. The turbine according to claim 1, wherein, when the turbine operates at baseload condition, the deflector allows the purging air to flow toward radial direction reaching the hot gas flow path channel to prevent the hot gas ingestion.

11. The turbine according to claim 1, wherein the deflector has a lower surface configured to drive part of the purging air to flow into the hot gas flow path channel wherein the hot burned gas flows.

12. The turbine according to claim 1, wherein between the stator spacer and the protective spacer is interposed a labyrinth seal.

13. The turbine according to claim 1, wherein the turbine is a low-pressure turbine.

14. A turbine, comprising:

a blade comprising a shank, a root coupled to the shank, an airfoil configured for intercepting a hot gas flow path, and a deflector configured to deflect hot gas flow;

a first spacer; and a second spacer parallel with the first spacer and spaced apart from the first spacer to form a channel therebetween, a purging system, wherein purging air from the purging system flows in contact with the deflector and into the channel.

15. The blade of claim 14, further comprising a rotor wheel wherein the deflector covers a gap between a protective spacer and the rotor wheel.

16. The blade according to claim 14, wherein the deflector has an upper surface configured to deflect possible gas ingestion from the hot gas flow path.

17. The blade according to claim 14, wherein the deflector has a lower surface configured to allow a purging air to flow into the hot gas flow path channel wherein the hot burned gas flows.

* * * * *